United States Patent [19]
Cottrell

[11] 4,062,108
[45] Dec. 13, 1977

[54] STICK INSERTION APPARATUS

[75] Inventor: Edward D. Cottrell, Cattaraugus, N.Y.

[73] Assignee: Champion International Corporation, Stamford, Conn.

[21] Appl. No.: 702,016

[22] Filed: July 2, 1976

[51] Int. Cl.² .............................................. B23Q 7/10
[52] U.S. Cl. .................................... 29/809; 29/281.1; 227/30; 227/120; 227/152; 227/153
[58] Field of Search ............... 29/211 R, 208 R, 244, 29/252, 809, 281.1; 227/152, 153, 117, 30, 116, 120, 26; 221/203, 205

[56] References Cited
U.S. PATENT DOCUMENTS

| | | | |
|---|---|---|---|
| 2,260,389 | 10/1941 | Lorentzen | 227/152 |
| 2,567,191 | 9/1951 | Anguera | 227/153 X |
| 2,733,439 | 2/1956 | Pikal | 227/116 X |
| 2,799,857 | 7/1957 | Raimondi | 227/117;152 X |
| 3,248,008 | 4/1966 | Meierjohan | 221/205 |
| 3,299,483 | 1/1967 | Dritz | 227/120 |
| 3,305,128 | 2/1967 | Dearsley | 221/205 X |

Primary Examiner—Victor A. DiPalma
Attorney, Agent, or Firm—Evelyn M. Sommer

[57] ABSTRACT

For mounting a food product, such as a frankfurter or an apple, on a stick, an apparatus includes relatively reciprocable jaws which converge on and hold the food product in position on an insertion axis. Individual sticks are gravity fed through a supply duct which aligns each stick with the insertion axis. A reciprocating rod drives each stick along the insertion axis into the food product.

9 Claims, 4 Drawing Figures

STICK INSERTION APPARATUS

BACKGROUND OF THE INVENTION

The present invention relates to stick insertion apparatus and more particularly to an apparatus for at least partially automating the task of mounting food products on sticks.

It is a long established custom for vendors at ball games, carnivals, fairs and at other places and events, to offer food products which have been mounted on sticks so that the products can be more easily prepared by the seller and more easily handled by the consumer. Well-known examples of products which are dispensed in this manner include deep-fried, batter-covered frankfurters, candied apples and corn on the cob.

Heretofore, food products such as those mentioned have been mounted on rounded, pointed sticks in a strictly manual operation. The process of manually forcing a stick into a food product can be a relatively slow and sometimes physically difficult one, particularly where the food product has a firm, unyielding core, such as a corn cob. Because the manual operation is time consuming, the labor costs are relatively high when compared to the normal selling prices for such products.

Also, because the task of manually forcing sticks into food products can be tedious and difficult, persons performing such a task may fail to consistently align the sticks with the products into which they are being inserted. The resulting food products can have an unpleasantly nonuniform appearance which subtly affects their saleability. Moreover, customers have been known to object when they bite down on a pointed stick end protruding from the normally inedible core of a food product such as an apple or ear of corn.

SUMMARY OF THE INVENTION

The present invention is a stick insertion apparatus for at least partially automating the process of mounting food products on sticks. The apparatus reduces the time and effort required while yielding a more uniform product.

The apparatus includes holding means which converge on and hold a product in a centered position on an insertion axis and stick supply means for positioning a stick on a supporting surface in alignment with the insertion axis. Means are included for driving the stick along the insertion axis into the product.

DESCRIPTION OF THE DRAWINGS

While the specification concludes with claims particularly pointing out and distinctly claiming that which is regarded as the present invention, further details of a preferred embodiment of the invention may be more readily ascertained from the following detailed description when read in conjunction with the accompanying drawings wherein:

DETAILED DESCRIPTION

Figure 1:
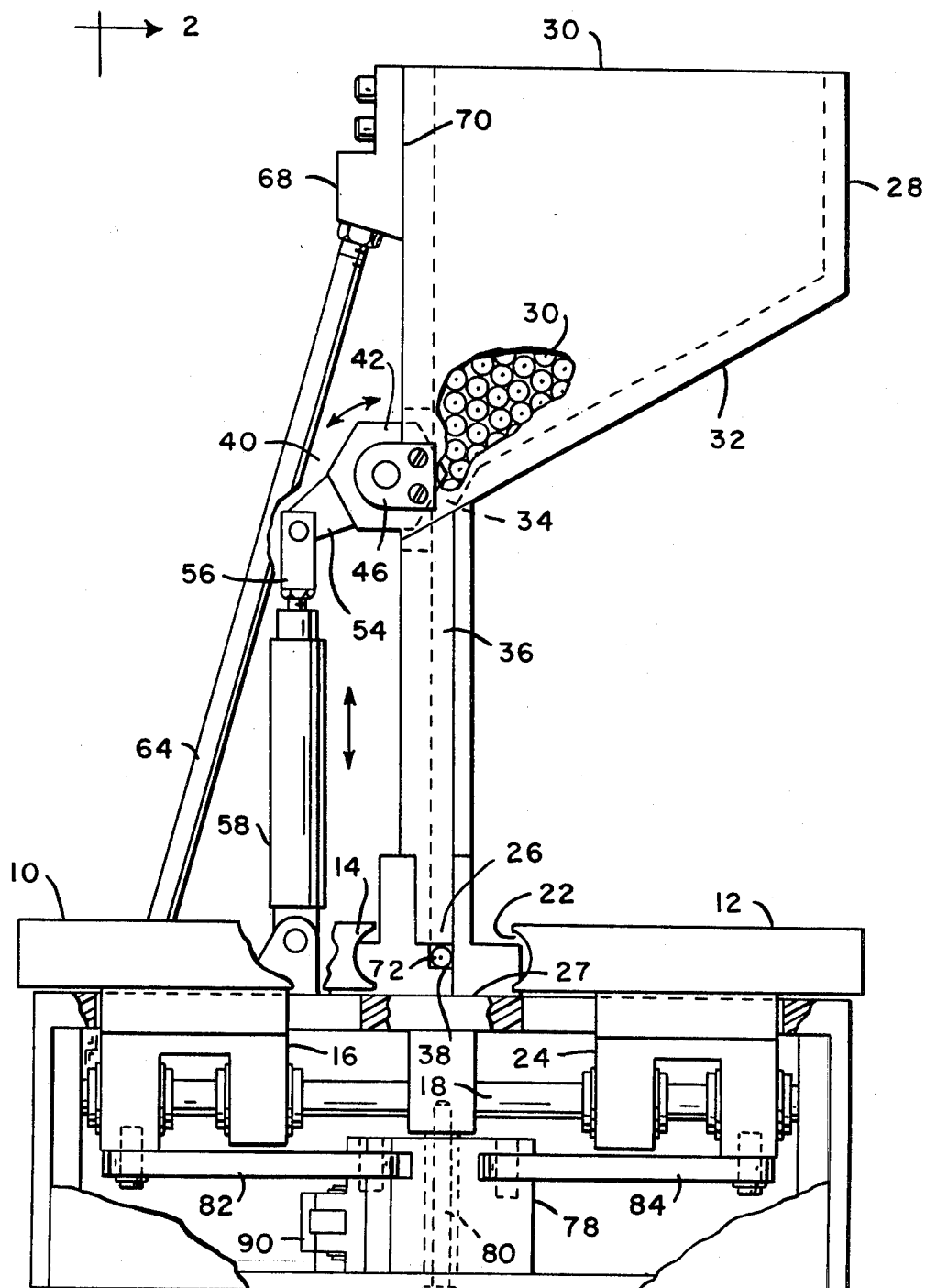
FIG. 1 is a front view of a stick insertion apparatus embodying the present invention.
Figure 2:
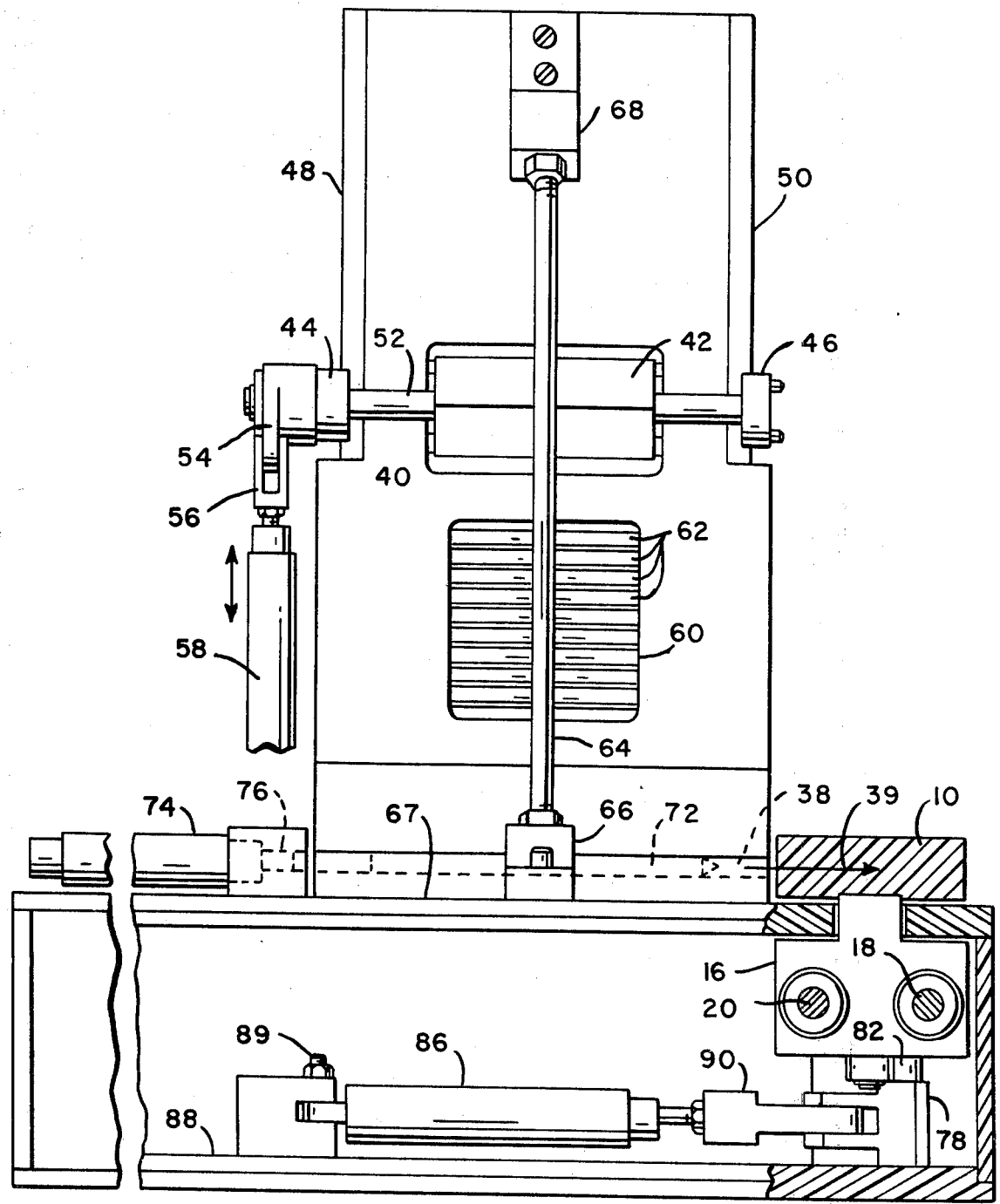
FIG. 2 is a side view of the stick insertion apparatus of FIG. 1.

Referring to FIGS. 1 and 2, the stick insertion apparatus includes first and second relatively-reciprocable holding members 10 and 12. Holding member 10, which includes a contoured jaw 14, has a generally U-shaped support 16 which guides member 10 along parallel shafts 18 and 20. Shaft 20 is on the same elevation as shaft 18 and can be seen only in a side view of FIG. 2.

Holding member 12 similarly includes a jaw 22, the contour of which is preferably a mirror image of the contour of jaw 14. Holding member 12 is carried by a generally U-shaped support 24 slidable along the twin shafts 18 and 20.

As illustrated in FIG. 1, both jaws 14 and 22 have an arcuate contour such that when they converge on a product, they circumferentially engage it along a major portion of its length. In this manner, products such as frankfurters may be steadily held for proper stick insertion.

The holding members 10 and 12 are linked to a common driving mechanism which causes the members 10 and 12 to be driven simultaneously in opposing directions. That is, holding members 10 and 12 may be made either to converge on a central, product-receiving area 26 for centering and holding a product previously placed on a surface 27 or to simultaneously diverge from area 26 to permit the product to be removed. The details of the linkage and drive mechanism are described later.

Sticks for insertion into products held between the converged jaws 14 and 22 are provided by a stick supply system including a storage hopper 28 having an open top 30 through which loose sticks may be loaded into the hopper. The sticks are preferably conventional round wooden or paper sticks having a single pointed end. When the sticks are loaded into the storage hopper 28, all are oriented with the pointed ends facing the front of the apparatus. The pointed ends of sticks oriented in this manner are shown at the cut-away section 30. The bottom wall 32 of storage hopper 28 slants toward a throat 34 of a narrow, vertical supply duct 36 which ends just above a stick-supporting surface 38. The inner dimensions of the supply duct 36 are only slightly larger than the exterior dimensions of the sticks which assures that only one stick at a time can be deposited on the stick supporting surface 38.

To minimize the chances that sticks will become jammed as they enter the supply duct 36, a continuously-driven agitator 40 is provided at throat 34. Agitator 40 includes a roll 42 having a non-circular cross-section, preferably the illustrated hexagonal cross-section. Roll 42 is carried by a shaft 52 journalled in a pair of pillow blocks 44 and 46. Pillow blocks 44 and 46 are attached to opposite side walls 48 and 50, respectfully, of the storage hopper 28.

Shaft 52 is coupled to one end of a crank 54 through a one-way clutch mechanism. The second end of crank 54 is coupled to a reciprocable drive rod 56. In a preferred embodiment drive rod 56 is continuously reciprocated while the machine is in operation by an air-driven piston within cylinder 58. The crank 54 an associated one-way clutch mechanism converts the reciprocating linear motion of drive rod 56 to intermittent movement of roll 42 in a counterclockwise direction as viewed in FIG. 2. As roll 42 intermittently moves, its ridged surface agitates the sticks in the area of throat 34.

The agitation tends to orient all of the sticks in the same direction to minimize the chances of jamming.

The supply duct 36 includes a transparent viewing window 60 to permit an operator to easily observe whether the duct is fully loaded with sticks 62 or whether more sticks must be added to the hopper 28.

The storage hopper 28 is carried off-center on the supply duct 36 and, as viewed in FIG. 1, would tend to distort the supply duct in a clockwise direction. To minimize any bending stress on the supply duct 36, a brace 64 extends between an anchor 66 secured to a frame plate 67 of the apparatus and a anchor 68 secured to a wall 70 of storage hopper 28. The brace 64 provides a tensioning force to offset any bending force which might otherwise be exerted on supply duct 36 by storage hopper 28. The brace 64 also tends to dampen any vibrations which might be set up by operation of the agitator 40.

The longer dimension of the rectangular supply duct 36 is aligned with an insertion axis which is indicated by arrow 39 in FIG. 2 and which extends out of the paper through the center of the product receiving area 26 in the front view of FIG. 1. With reference now to FIG. 2, an air-driven cylinder 74 can be actuated to force a drive rod 76 to the right. The rod 76 drives stick 72 into a food product clamped between jaws 14 and 22. When the stick 72 has been fully inserted, cylinder 74 can again be actuated to retract drive rod 76, thereby permitting another stick 72 to drop into place from supply duct 36 onto the stick supporting surface 38. As the drive rod 76 is retracted, the jaws 14 and 22 may be simultaneously withdrawn from product receiving area 26 by means of a jaw-actuating mechanism which will now be described.

The linkage of the jaw actuating mechanism includes a bell crank 78 mounted for rotation about a fulcrum 80 which extends along an axis perpendicular both to the insertion axis and to the axis of movement of the holding members 10 and 12. The support 16 for holding member 10 is connected to bell crank 78 through an arm 82 pinned at each end so as to be moveable relative to both support 16 and bell crank 78. Similarly, the support 24 for holding member 12 is connected to the bell crank 78 through a pin-mounted arm 84. An air-powered cylinder 86 has a first end which is pinned to a base plate 88 of the apparatus by a bolt 89 which permits only limited rotational movement of the first end. A drive rod 90 extending from the opposite end of cylinder 86 is connected to a drive point of bell crank 78.

Figure 3:
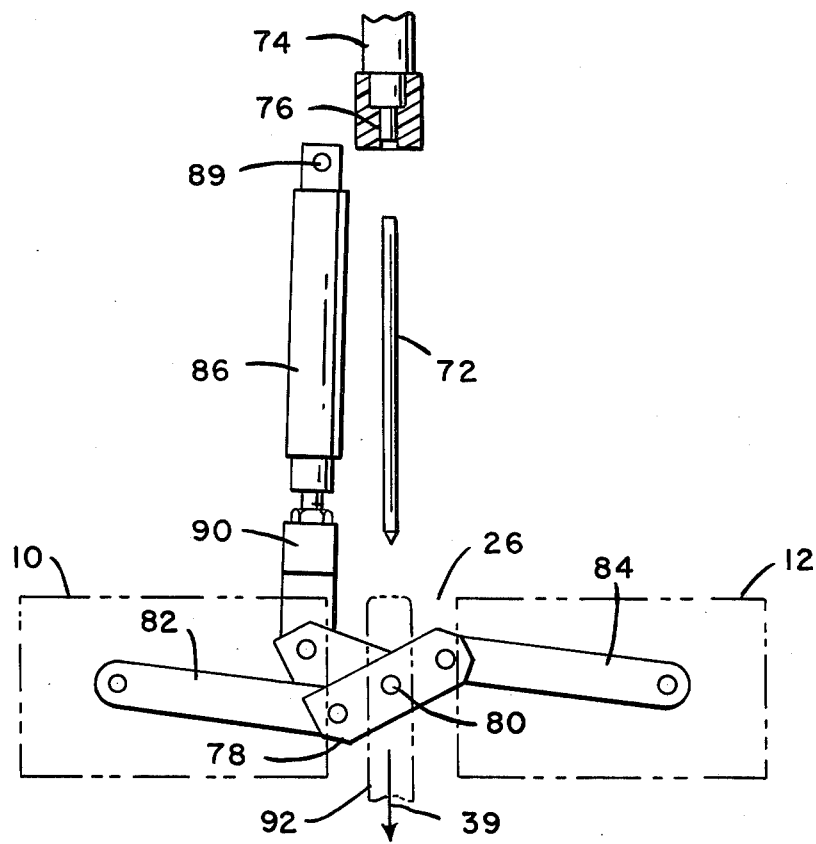
FIG. 3 is a diagrammatic plan view showing details of the jaw actuating mechanism of the apparatus of FIG. 1 with the jaws open to receive an article of food prior to insertion of a stick.
Figure 4:
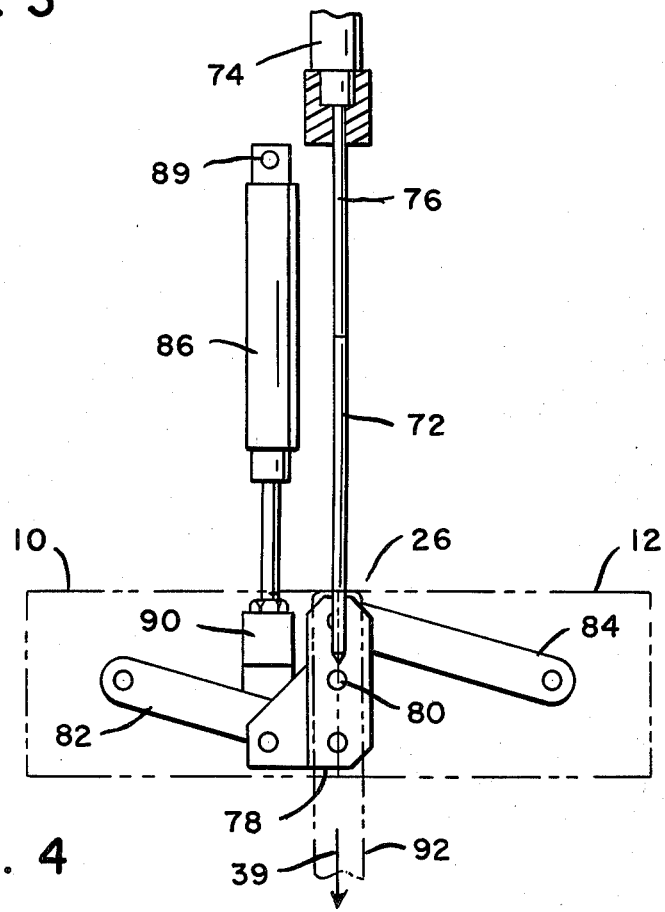
FIG. 4 is a view similar to FIG. 3, but with the jaws closed and a stick being inserted into the food article.

Referring to FIG. 3, when drive rod 90 is retracted, bell crank 78 is rotated in a clockwise direction about fulcrum 80, forcing the ends of arms 82 and 84 outwardly or away from the insertion axis identified by arrow 39. When the linkage is in this position, the jaws 12 and 22 are separated and a product such as a frankfurter 92 can be placed in the product receiving area 26. During this time, the stick drive rod 76 is retracted into cylinder 74.

Once a product is positioned roughly within the product receiving area 26, the apparatus may be energized to perform the actual insertion process. In a preferred embodiment, an operator initiates this process by means of a foot switch or a pushbutton. When the apparatus is energized, drive rod 90 forces the bell crank 78 in a counterclockwise direction about the fulcrum 80 which, in turn, causes arms 82 and 84 to draw blocks 10 and 12, respectfully, inwardly. As the blocks 10 and 12 converge on the product receiving area 26, the jaws 14 and 22 center the frankfurter 92, on the insertion axis. An air circuit mechanism (not shown) of conventional design would cause cylinder 74 to move rod 76 along the insertion axis 39, driving stick 72 into frankfurter 92. When drive rod 76 reaches the limit of its stroke, the same air circuit mechanism causes rod 76 and drive rod 90 to be retracted to the positions shown in FIG. 3. The stick-mounted frankfurter can then be manually removed from the product receiving area 26 and an unmounted frankfurter loaded into the area.

Since the jaws 14 and 22 automatically center and hold the food product on the insertion axis and since the drive rod 76 forces the stick into the product, all that a user must do is load unmounted products, remove mounted products, occasionally fill the storage hopper 28 and push the button or switch which initiates the actual insertion process. Less time and effort is required of the operator and a more uniform product should result.

While the apparatus illustrated is intended for mounting frankfurters, the modifications required for mounting apples or corn on the cob or even other non-food products are obvious. The contours of the jaws 14 and 22 will obviously depend upon the contours of the products being mounted. Similarly, the height of the stick supporting surface (or insertion axis) above the product supporting surface must be approximately equal to the average radius of the product.

While there has been described what is considered to be a preferred embodiment of the invention, variations and modifications thereof may occur to those skilled in the art once they become familiar with the basic concepts of the invention. Therefore, it is intended that the appended claims shall be construed to include all such variations and modifications as fall within the true spirit and scope of the invention.

What is claimed is:

1. An apparatus for mounting products on a stick comprising:
   a. opposed first and second reciprocable holding members, each of said holding members having a contoured, product engaging surface that is a mirror image of the opposed surface, said contoured product engaging surfaces being operative to center and circumferentially engage a product, along a major portion of its length, in a position on an insertion axis;
   b. means for reciprocating said first and second holding members such that they simultaneously converge or diverge in a direction perpendicular to the insertion axis;
   c. stick supply means for positioning a stick on a supporting surface in alignment with the insertion axis; and
   d. means for driving the stick along the insertion axis into the product held by said holding means.

2. An apparatus for mounting products on a stick as recited in claim 1 in which the product engaging surfaces are arcuate.

3. An apparatus as recited in claim 2 wherein said reciprocating means further comprises:
   a. means for linking said first and second holding members for simultaneous movement in opposing directions; and
   b. drive means connected to said linking means, said drive means being moveable in the first direction to cause said first and second holding members to converge and in a second direction to cause said first and second holding members to diverge.

4. An apparatus as recited in claim 3 wherein said stick-driving means comprises a reciprocating, driven rod aligned with the stick so as to push the stick along the insertion axis in one direction.

5. An apparatus as recited in claim 4 wherein said linking means further comprises:
 a. a bell crank mounted for movement about a fulcrum having an axis perpendicular to both the insertion axis and the axis of said guide member, said bell crank having a drive point spaced from its fulcrum axis;
 b. a first arm pivotably connecting said first holding member to a first point on said bell crank spaced from both the drive point and the fulcrum of said bell crank; and
 c. a second arm pivotably connecting said second holding member to a second point on said bell crank on the opposite side of the fulcrum from said first point.

6. An apparatus as recited in claim 5 wherein said drive means further comprises a reciprocating drive rod attached to the drive point of said bell crank for driving said bell crank through an arc centered on the fulcrum.

7. An apparatus as recited in claim 6 wherein said stick supply means further includes:
 a. a storage hopper for holding a supply of sticks generally oriented in parallel with the insertion axis;
 b. a supply duct communicating with said storage hopper and having a lower end terminating on the insertion axis, just above the stick supporting surface, the interior dimensions of said duct being large enough to pass only one stick at a time to the stick supporting surface.

8. An apparatus as recited in claim 7 wherein said stick supply means further includes an agitator extending into the throat of said supply duct for minimizing the possibility of jamming at the throat.

9. An apparatus as recited in claim 8 wherein said agitator further comprises:
 a. a roll mounted for rotation about an axis parallel to the axis of insertion, said roll having a non-circular cross-section; and
 b. agitator drive means for intermittently rotating said roll through a limited arc.

* * * * *